(12) United States Patent
Brown et al.

(10) Patent No.: US 6,633,171 B2
(45) Date of Patent: *Oct. 14, 2003

(54) ELECTRONIC COMPONENT DESIRED VOLTAGE LEVEL COMPARISON

(75) Inventors: Alan E. Brown, Georgetown, TX (US); Steven J. Lash, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 218 days.

This patent is subject to a terminal disclaimer.

(21) Appl. No.: 09/817,835

(22) Filed: Mar. 26, 2001

(65) Prior Publication Data

US 2001/0014953 A1 Aug. 16, 2001

Related U.S. Application Data

(63) Continuation of application No. 09/237,087, filed on Jan. 25, 1999, now Pat. No. 6,272,643.

(51) Int. Cl.⁷ .................. G01R 27/04; G01R 31/08; G06F 01/28; G08B 21/00
(52) U.S. Cl. .................. 324/647; 324/522; 713/300; 713/340; 340/661
(58) Field of Search .................. 324/647, 416, 324/522, 713, 98, 103 R, 537, 142; 713/300, 340; 340/660, 661

(56) References Cited

U.S. PATENT DOCUMENTS

| | | | |
|---|---|---|---|
| 5,343,086 A | 8/1994 | Fung et al. | 307/296.1 |
| 5,485,576 A | 1/1996 | Fee et al. | 395/185.09 |
| 5,502,838 A | 3/1996 | Kikinis | 395/550 |
| 5,754,445 A | 5/1998 | Jouper et al. | 364/492 |
| 5,774,736 A | 6/1998 | Wright et al. | 395/750.07 |
| 5,959,441 A | 9/1999 | Brown | 323/282 |
| 5,990,669 A | 11/1999 | Brown | 323/282 |
| 6,272,643 B1 * | 8/2001 | Brown et al. | 713/300 |
| 6,289,467 B1 * | 9/2001 | Lewis et al. | 713/340 |

* cited by examiner

Primary Examiner—Anjan K. Deb
(74) Attorney, Agent, or Firm—Baker Botts L.L.P.

(57) ABSTRACT

A comparison circuit for comparing the desired voltage levels of electronic components and for disabling the supply of power to those components if the desired voltage levels are not equivalent. The comparison circuit receives the desired voltage level indication signals and provides a signal indicating whether the desired voltage levels are equivalent. If the desired voltage levels are not equivalent, the comparison circuit provides a signal indicating non equivalency to a power supply, wherein the power supply is disabled from supplying power so as not to damage the computer components from receiving power at a non allowable voltage level. The comparison circuit also provides an output signal indicative of an equivalent voltage level to the desired voltage levels if the desired voltage levels are equivalent. A power supply converter supplies power to the components at a voltage level as indicated by the output signal. The comparison circuit can be implemented in a computer system such as a multiprocessor computer system where each processor module provides a desired voltage level indication signal to the comparison circuit.

41 Claims, 3 Drawing Sheets

ELECTRONIC COMPONENT DESIRED VOLTAGE LEVEL COMPARISON

CROSS REFERENCE TO RELATED APPLICATION

This patent application is a Continuation application of U.S. patent application Ser. No. 09/237,087, filed Jan. 25, 1999, now U.S. Pat. No. 6,272,643.

BACKGROUND OF THE INVENTION

1. Field of the Invention

This invention in general relates to a supply of power to electronic system components and in particular to a comparison of the desired voltage levels of that supply.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Personal computer (PC) systems, such as the International Business Machines (IBM) (tm) compatible PC systems, include desk top, floor standing, or portable versions. A typical PC system includes a processor, associated memory and control logic, and a number of peripheral devices that provide input and output for the system. Such peripheral devices often include display monitors, keyboards, mouse-type input devices, floppy and hard disk drives, CD-ROM drives, printers, network capability cards, terminal devices, modems, televisions, sound devices, voice recognition devices, electronic pen devices, and mass storage devices such as tape drives, CD-R drives, or DVDs. Other types of computer systems may also include similar devices as well.

Computer systems and other types of electronic systems employ power supplies to provide power for a system within required parameters. Some types of power supplies convert alternating current (AC) power to direct current (DC) power at regulated voltage levels required by the system for proper operation. Such voltage levels may include +/−12 VDC, +/−5 VDC, and +/−3.3 VDC. Some power supplies convert DC power having a first set of parameters to DC power having a second set of parameters. Some power supplies utilize batteries as the original power source.

Computer system components such as processors, memory devices, and other electronic circuits require power at specific voltage levels or ranges in order to operate properly. To ensure that the proper voltage level is provided, some components of a system may provide a voltage level indication signal to the power supply to indicate a desired voltage level for the supply of power to the component and, in some cases, other components of the system. An example of one such system is found in U.S. Pat. No. 5,959,441 entitled "Voltage Supply Regulation Using Master/Slave Timer Circuit Modulation," inventor Alan E. Brown, filed on Dec. 15, 1997, and having a common assignee, all of which is hereby incorporated by reference in its entirety.

For some electronic systems, it is economically desirable to limit the number of power supplies in the system. Accordingly, power for multiple components may be supplied from a single power supply. With such systems, proper design and manufacture techniques can usually ensure that all components of the system require the same voltage levels of power. However, the practical realities of today's computer industry are of low cost part assembly stores and frequent component upgrades. With such realities, compatibility of voltage requirements are not always assured. Such voltage level requirement miss-matches can lead to component substandard performance or component failure. An example of a system where a problem may occur is with multiprocessor computers where the different processors may have different desired voltage levels for the supply of power to each processor.

What is needed is a circuit to compare the desired voltage levels of different components and to provide indications of those comparisons in order to prevent damage to components in the event of non equivalent desired voltage levels.

SUMMARY OF THE INVENTION

It has been discovered that a circuit that compares the desired voltage levels of power for components of an electronic system and provides an indication of the comparison can achieve numerous advantages. One advantage is that such an indication can be used to disable the supply of power to electronic components of a system if an indication of non equivalency is provided. It can also be used to provide a visual indication of such a condition. If the desired voltage levels are equivalent, an indication of an equivalent desired voltage level can be provided to a power supply to power multiple electronic components from the power supply at an equivalent desired voltage level.

In one aspect of the invention, a computer system includes a plurality of computer components and a comparison circuit having a plurality of inputs. Each input is for receiving an indication signal indicating a desired voltage level of power for a respective computer component. The comparison circuit also has an output. The computer system also includes a power supply configured to supply power to the respective computer components. The comparison circuit provides at its output a disable signal to disable the power supply from supplying power to the respective computer components as a result of a non equivalency in the desired voltage levels as determined by the comparison circuit.

In another aspect of the invention, a computer system includes means for receiving a plurality of indications, each indicating a desired voltage level of power for a respective computer component. The computer system also includes means for disabling a supply of power to the respective computer components as a result of a non equivalency in the desired voltage levels.

In another aspect of the invention, a method for comparing desired voltage levels of electronic components includes receiving a plurality of indication signals. Each indication signal received indicates a desired voltage level of power for a respective electronic component. The method also includes comparing the desired voltage levels of the indication signals received and disabling a power supply from supplying power to the respective electronic components as result of a non equivalency in the desired voltage levels as determined by the comparison.

In another aspect of the invention, a comparison circuit includes a first input for receiving a first indication signal indicating a desired voltage level of power for a first electronic component and a second input for receiving a second indication signal indicating a desired voltage level of power for a second electronic component. The comparison circuit also includes an output for providing an output indication signal indicating an equivalent desired voltage level as a result of a determination that the desired voltage levels are equivalent.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise indicated.

DETAILED DESCRIPTION

The following sets forth a detailed description of a mode for carrying out the invention. The description is intended to be illustrative of the invention and should not be taken to be limiting.

Figure 1:
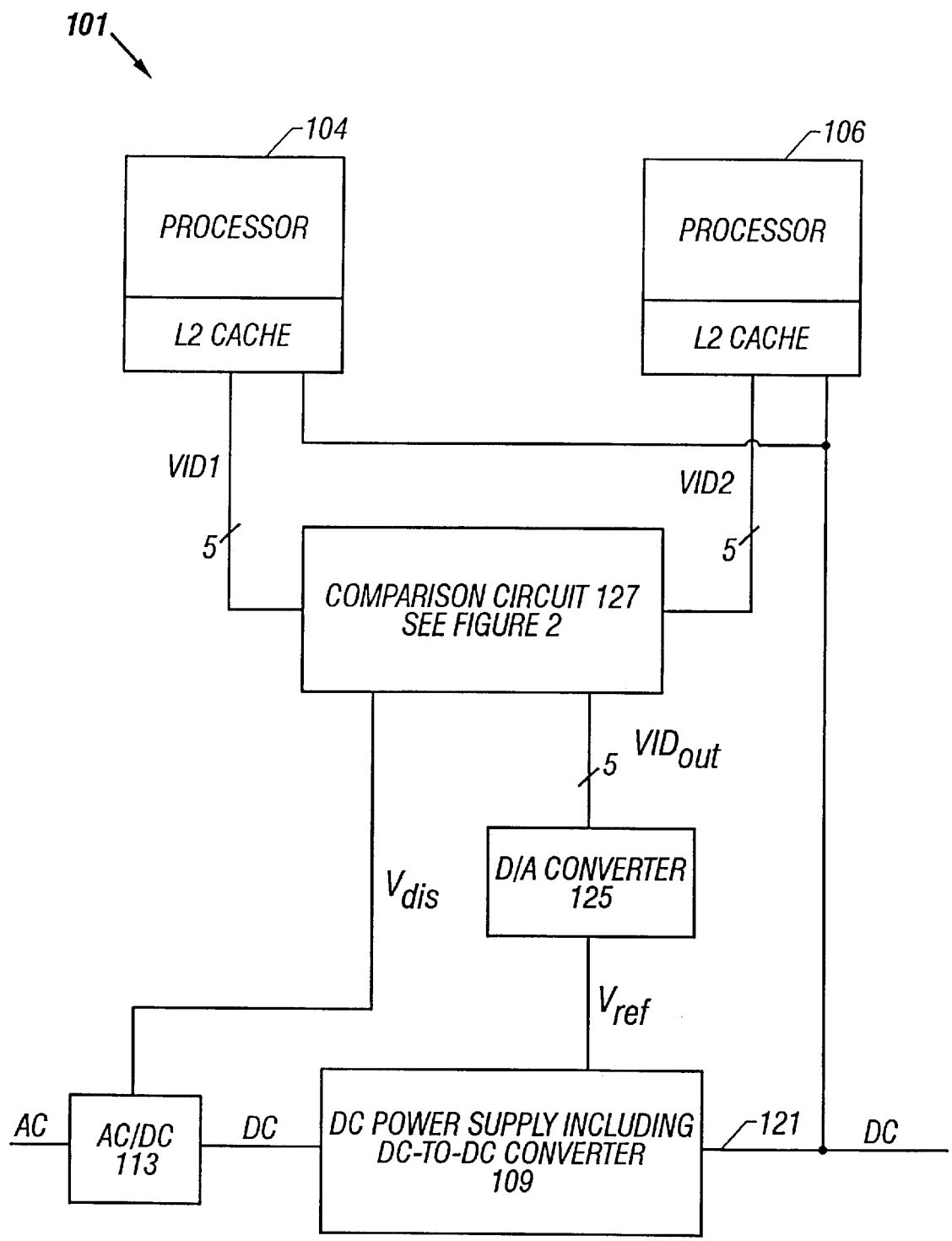
FIG. 1 is a block diagram of one example of an electronic system implementing a comparison circuit according to the present invention.

FIG. 1 shows a block diagram of one example of an electronic system incorporating a comparison circuit according to the present invention. The electronic system shown in FIG. 1 is a multi-processor computer system 101 such as the PRECISION 610 WORKSTATION sold by the DELL COMPUTER CORP. Computer system 101 includes two processor modules 104 and 106. A processor module typically includes a processor circuit such as a processor circuit conforming to the INTEL X86 architecture or other processor architectures. Processor modules 104 and 106 also include L2 caches which can either be integrated on a semiconductor chip with the processor or implemented separately. With some systems, a processor module is implemented on a daughter card and includes terminations and circuitry for local processor busses as well as other conventional circuitry. With other systems, a processor module is located on a computer system motherboard (not shown). An example of a processor module is a PENTIUM II (tm) cartridge sold by the INTEL CORPORATION.

Each processor module 104 and 106 receives power from a DC power supply 109 which includes a DC-to-DC voltage converter. DC power supply 109 receives DC power from power supply 113 which includes an AC to DC rectifier for converting AC power to DC power. The DC-to-DC converter of power supply 109 may have one of a number of conventional converter topologies such as linear converter topologies and switching converter topologies including e.g. buck, boost, forward converter, push-pull, half and full bridge, fly-back, and multiphase. Power supply 109 may also receive power from a battery power source. The DC-to-DC converter of DC power supply 109 provides at its output 121 DC power at a regulated voltage level which is supplied to components of the computer system including components of the processor module. With some systems, DC power supply 109 is mounted on the system mother board (not shown) and power supply 113 is mounted in the system chassis (not shown). With other systems, the components of power supplies 113 and 109 are implemented as an integrated power supply.

In FIG. 1, processor modules 104 and 106 each include output terminals configured to provide a voltage level indication signal. These indication signals (labeled VID1 and VID2) provide indications of a desired voltage level for the supply of power to components of the processor module such as the L2 cache. With some systems, a "desired" voltage level for a component may be a required voltage level, wherein the component does not operate properly if not supplied at that voltage level. With other components, the desired voltage level may indicate a voltage level where the component operates at optimum performance. In FIG. 1, each voltage reference indication signal includes five parallel discrete signals providing a digital value indicating a desired voltage level. Each possible digital value of an indication signal corresponds to a specific voltage level. With other systems, the voltage indication signal may have a different number of discrete signals or have other forms such as analog and serial digital forms. With other processor modules, the processor circuit or other components may provide the desired voltage indication signals.

Comparison circuit 127 receives both voltage level indication signals from processor modules 104 and 106 and provides signals that indicate a result of the comparison. If the voltage reference indication signals are not determined to be equivalent as a result of the comparison, then the comparison circuit places the $V_{dis}$ signal in a state that indicates a non equivalency in the desired voltage levels. In response to receiving a $V_{dis}$ signal in a state indicating a non equivalency in the desired voltage levels, the control circuitry (not shown) of power supply 113 disables power supply 113 from supplying DC power to power supply 109, thereby disabling power supply 109 from supplying power at its output 121. With other systems, the $V_{dis}$ signal is provided to power supply 109 wherein in response to receiving a $V_{dis}$ signal in a state indicating a non equivalency, the control circuitry (not shown) of power supply 109 disables power supply 109 from supplying DC power at output 121.

As a result of a determination that the desired voltage levels are equivalent based upon the comparison of the desired voltage levels, the comparison circuit provides an output indication signal ($VID_{out}$) that includes 5 parallel discrete signals providing a digital value indicating an equivalent voltage level to the two desired voltage levels as indicated by the VID signals received from processor modules 104 and 106. In FIG. 1, a digital to analog (D/A) converter 125 converts the digital $VID_{out}$ signal into an analog $V_{ref}$ signal having a voltage level indicative of the equivalent voltage. An example of a D/A converter is found in the U.S. patent application entitled "Voltage Supply Regulation Using Master/Slave Timer Circuit Modulation," as described in the "Background" section above. With some systems, the D/A converter may be integrated with the comparison circuit or integrated with the control circuitry (not shown) of power supply 109. Also, the comparison circuit may be integrated with the control circuitry (not shown) of power supply 113 or power supply 109. For comparison circuits providing other than a digital voltage level indication signal, a D/A converter would not be utilized. With other systems, D/A converters would be located between the comparison circuit and each processor module wherein the comparison circuit would receive analog indication signals and provide the $VID_{out}$ signal in analog form to the DC converter of power supply 109.

The voltage level of output 121 is controlled by a $V_{ref}$ signal. In FIG. 1, $V_{ref}$ is an analog signal having a voltage level at (or proportional to) an equivalent voltage to the desired voltage levels. With some types of power supplies, $V_{ref}$ is an input into an error amplifier (not shown) of the secondary side control circuitry (not shown) of the power supply 109 DC-to-DC converter. With other converters such as switching converters, $V_{ref}$ can be inputted into the primary control converter circuitry (not shown) and is used to control the duty cycle of the switching signal which controls the voltage level of converter output 121. With other converters, the $V_{ref}$ signal may have other forms. Those of skill in the art will recognize that any number of conventional techniques can be utilized for controlling the voltage level of the output of a DC-to-DC converter with a reference signal.

Figure 2:
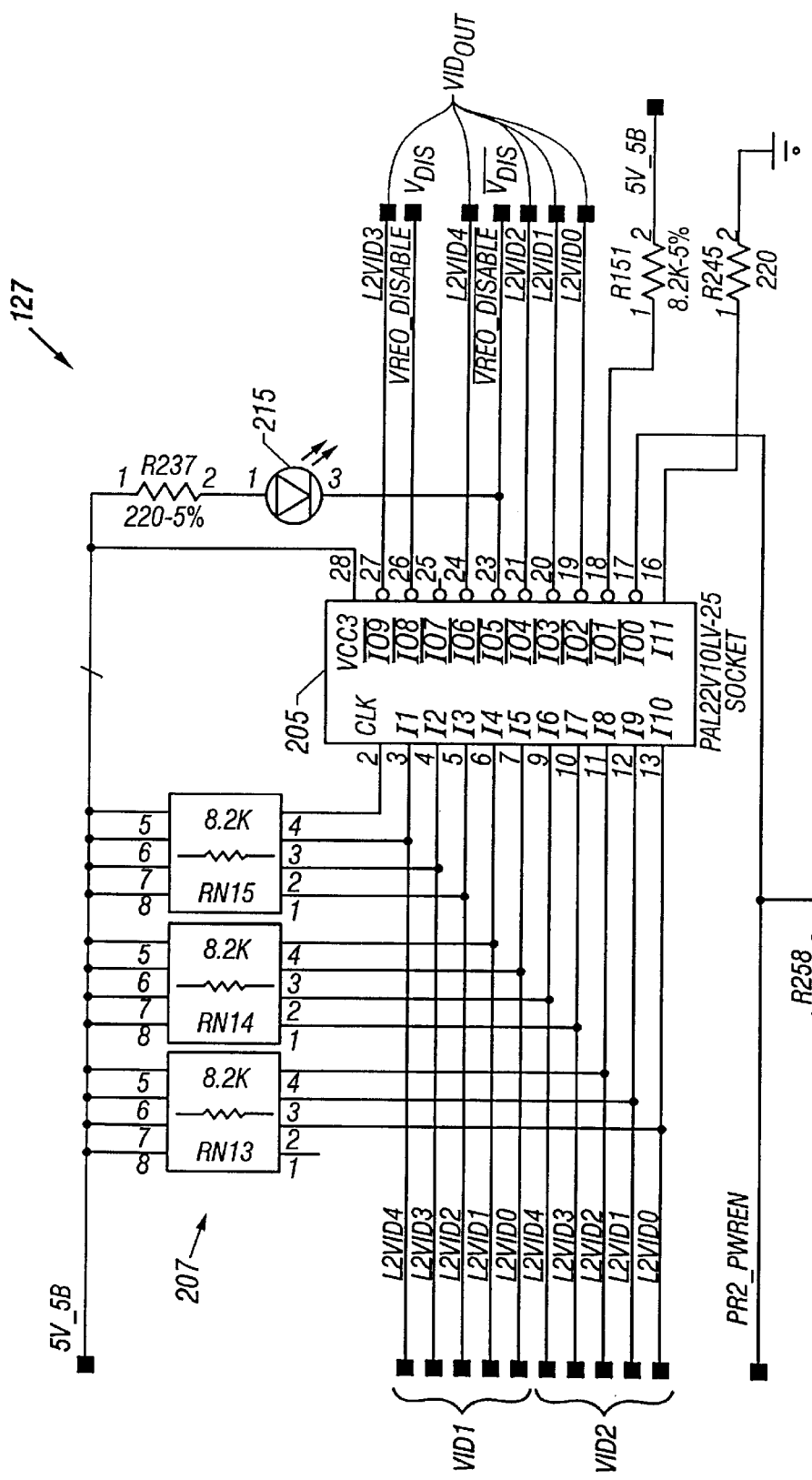
FIG. 2 is a circuit diagram of one example of a comparison circuit according to the present invention.

FIG. 2 shows a circuit diagram of one example of a comparison circuit. Comparison circuit 127 includes a programmable array logic (PAL) device 205 such as the PAL22V10LV-25 sold by ATMEL INC. Input terminals I1–I5 make up a first input for receiving a voltage reference indication signal (VID1) from processor module 104 and input terminals I6–I10 make up a second input for receiving a second voltage reference indication signal (VID2) from processor module 106. The signal lines connected to the input terminals are connected to pull-up resistors 207 which are each connected on another end to a +5 VDC auxiliary stand-by power source (5V_SB) (not shown) of power supply 113. Output terminals *IO9, *IO6, and *IO2-*IO4 provide the $VID_{out}$ signal. Output terminal *IO8 provides the $V_{dis}$ signal.

Comparison circuit 127 also includes an LED 215 for providing a visual indication of non equivalent desired voltage levels.

PAL 205 is programmed such that when the digital value of VID1 is equal to VID2, the PAL provides signal $VID_{out}$ with a value equal to that of VID1 and places the $V_{dis}$ signal in a logical 0 state to indicate that the desired voltage levels are equivalent. Accordingly, $*V_{dis}$ is provided with a high voltage level such that LED 215 does not illuminate.

If the digital value of VID1 does not equal the digital value of VID2, then PAL 205 places $V_{dis}$ at a logical 1 state indicating that the desired voltages are not equivalent. The $V_{dis}$ signal in a logical 1 state disables power supply 113 (and consequently power supply 109) thereby preventing the components of the processor modules from operating and preventing damage to the components of computer system 101. Also, as a result of determining that the desired voltages are not equal, PAL 205 places $*V_{dis}$ in a low voltage state, thereby illuminating LED 215 to provide a visual indication that the desired voltages are not equivalent.

In the above exemplary operation of PAL 205, the $V_{dis}$ signal being placed in a state indicating that the desired voltage levels are "non equivalent" requires that the VID1 and VID2 signals not be equal to each other. However, PAL 205 may be programmed such that the voltage level indication signals do not have to be equal for the $V_{dis}$ signal to indicate that the two voltage levels are "equivalent." For example, PAL 205 could be programmed such that if the two voltage level indication signals VID1 and VID2 were within a predetermined digital range of each other (such as a digital range of 2 of each other e.g. VID1=01110 and VID2=01100), PAL 205 would place the $V_{dis}$ signal in a state indicating equivalency and provide the $VID_{out}$ signal with a value indicative of either one of the input VID signal values or a value in between the input VID signal values. If the desired voltage level indication signals were outside of the predetermined digital range of each other (e.g. outside a digital value of 2), PAL 205 would place the $V_{dis}$ signal in a state indicating a non equivalency. Such a program could be utilized where the desired voltage level indication signals of one type or make of component is not 100% compatible with the voltage level reference signals of the other components. Also, such a program could be utilized where the incremental difference in the levels of the voltage level indication signals are less than the tolerances of the required voltages for the components.

Where the desired voltage level indication signal takes other forms, the specified parameter that the two signals would be required to be within to provide an indication of equivalency would also have a different form. For example, if the voltage level indication signals have an analog form, the specified parameter may be that the indication signals must be within a specific voltage level (e.g. ±0.05V) of each other.

Although FIGS. 1 and 2 show a comparison circuit with only two inputs, each for receiving a desired voltage level indication signal, other comparison circuits may include more than two inputs for receiving indication signals, thus allowing the comparison circuit to receive indication signals from more than two electronic components. For example, referring ahead to FIG. 3, a comparison circuit for computer system 101 may include four inputs, an input for each processor module 104 and 106, an input for system memory 309, and an input for Flash ROM 311.

Referring back to FIG. 2, for those systems where not all of the comparison circuit inputs for receiving indication signals are operably coupled to receive an indication signal indicating a desired voltage level for a computer component, PAL 205 can determine from the state of the input whether the input is not operably coupled to receive an indication signal indicating a desired voltage level. For example, if input terminals I1–I5 are not receiving a voltage level indication signal, then those input terminals will be approximately at the +5V_SB level. Upon determining that only the second input is receiving a voltage level indication signal, PAL 205 provides a $VID_{out}$ signal indicating a voltage level equal to VID2. Consequently, if only the first input is receiving a voltage level indication signal and the second input is not, then $VID_{out}$ will equal VID1. If the comparison circuit includes more than two inputs and one of the inputs is not operably coupled to receive a signal indicating a desired voltage level of a computer component, a comparison circuit can be configured to provide an indication of non equivalency based upon a comparison of only the received indication signals. For example, if a comparison circuit includes four inputs, but only two inputs are operably coupled to receive indication signals of computer components, then the comparison circuit's indication of non equivalency will be based upon the values of the two voltage level indication signals received. An example of a situation is where an input is not operably coupled to receive an indication signal is where a termination card occupies a processor module daughter card slot.

Based upon the teachings herein, those of skill in the art will appreciate that a comparison circuit performing the above operations can be implemented in other ways in addition to those shown in the Figures and described above. For example, a comparison circuit may be implemented with logic hardware, either with separate components or as an integrated component. Also, the comparison circuit may be implemented with other types of programmable devices. Where the desired voltage level indication signals have an analog form, an analog comparison circuit may be utilized.

Figure 3:
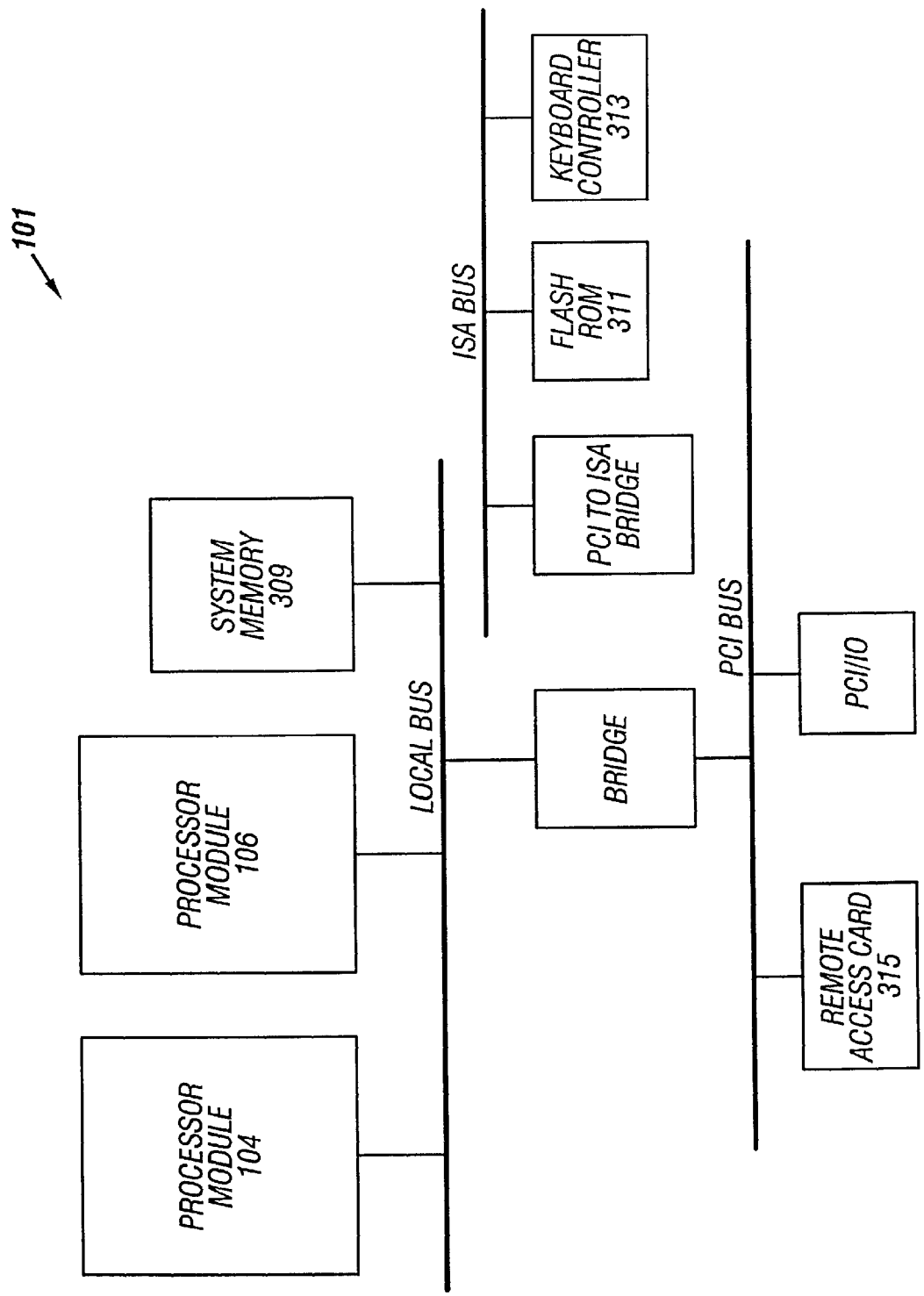
FIG. 3 is a block diagram of one example of a multiprocessor computer system.

FIG. 3 shows a block diagram of computer system 101 which is a multi-processor computer system. An example of a multi-processor computer system is the PRECISION 610 WORKSTATION sold by the DELL COMPUTER CORP. A system memory 309 is operably coupled to the processors of processor modules 104 and 106 via a local computer bus. Computer system 101 also includes a Flash ROM 311 and keyboard controller 313 operably coupled to the processors of processor modules 104 and 106 via an ISA computer bus, PCI computer bus, and local computer bus, all of which are conventional. Computer system 101 also includes a remote access card for operably coupling computer system 101 to a computer network.

The comparison circuit may be mounted on the system planar board (not shown) of computer system 101 adjacent to the processor module slots. However, the comparison circuit may be physically implemented in other ways with different computer systems.

FIG. 3 is presented as one example of a computer system that incorporates a comparison circuit such as comparison circuit 127. However, based upon the teachings herein, those of skill in the art will appreciate that a comparison circuit may be implemented with other types of computer systems or other electronic systems.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A comparison circuit comprising:
    a first input for receiving a first indication signal indicating a first desired voltage level of power for a first electronic component;
    a second input for receiving a second indication signal indicating a second desired voltage level of power for a second electronic component; and
    an output for providing an output indication signal indicating an equivalent desired voltage level as a result of a determination that the first and second desired voltage levels are equivalent.

2. The comparison circuit of claim 1 wherein as a result of a determination that only one of the first and second inputs is receiving an indication signal indicating a desired voltage level, the comparison circuit provides an output indication signal indicating the desired voltage level as determined by the indication signal received from the only one input.

3. The comparison circuit of claim 2 wherein an input of the comparison circuit being at a particular signal state indicates that the input is not receiving an indication signal of a desired voltage level.

4. The comparison circuit of claim 1 wherein each of the first and second indication signals provides a digital value indicating a desired voltage level for each of the first and second electronic components.

5. The comparison circuit of claim 4 wherein each of the first and second indication signals includes a plurality of parallel discrete signals and wherein each of the first and second inputs includes a plurality of input terminals for receiving the parallel discrete signals.

6. The comparison circuit of claim 1 further comprising:
    a second output for providing a second output signal having a first state indicative that the first and second desired voltage levels are not equivalent.

7. The comparison circuit of claim 6 wherein the second output signal being in the first state requires the first and second indication signals not to be equal.

8. The comparison circuit of claim 6 wherein the second output signal being in the first state requires the first and second indication signals not to be within a specified parameter of each other.

9. The comparison circuit of claim 1 further comprising an indication light for providing an indication that the first and second desired voltage levels are not equivalent.

10. The comparison circuit of claim 1 wherein a determination that the first and second desired voltage levels are equivalent requires that the first and second indication signals be equal.

11. The comparison circuit of claim 1 wherein a determination that the first and second desired voltage levels are equivalent requires the first and second indication signals to be within a specified parameter of each other.

12. The comparison circuit of claim 1 wherein:
    the output includes a plurality of output signal terminals; and
    the output indication signal includes a plurality of parallel discrete signals, each provided on one of the plurality of output signal terminals.

13. The comparison circuit of claim 1 wherein the comparison circuit further includes:
    a programmable array logic device having a plurality of input terminals for receiving the first and second indication signals and at least one output terminal for providing the output indication signal.

14. The comparison circuit of claim 1 further comprising:
    a third input for receiving a third indication signal indicating a third desired voltage level of power for a third electronic component.

15. A computer system comprising:
    a plurality of computer components;
    a comparison circuit including:
        a first input for receiving a first indication signal indicating a first desired voltage level of power for a first computer component;
        a second input for receiving a second indication signal indicating a second desired voltage level of power for a second computer component; and
        an output for providing an output indication signal indicating equivalent desired voltage level as a result of a determination that the first and second desired voltage levels are equivalent.

16. The computer system of claim 15 wherein as a result of a determination that only one of the first and second inputs is receiving an indication signal indicating a desired voltage level, the comparison circuit provides an output indication signal indicating the desired voltage level as determined by the indication signal received from the only one input.

17. The computer system of claim 16 wherein an input of the comparison circuit being at a particular signal state indicates that the input is not receiving an indication signal of a desired voltage level.

18. The computer system of claim 15 wherein each of the first and second indication signals provides a digital value indicating a desired voltage level for each of the first and second electronic components.

19. The computer system of claim 18 wherein each of the first and second indication signals includes a plurality of parallel discrete signals and wherein each of the first and second inputs includes a plurality of input terminals for receiving the parallel discrete signals.

20. The computer system of claim 15 wherein the comparison circuit further includes:
    a second output for providing a second output signal having a first state indicative that the first and second desired voltage levels are not equivalent.

21. The computer system of claim 15 further comprising an indication light for providing an indication that the first and second desired voltage levels are not equivalent.

22. The computer system of claim 15 wherein a determination that the first and second desired voltage levels are equivalent requires that the first and second indication signals be equal.

23. The computer system of claim 15 wherein a determination that the first and second desired voltage levels are equivalent requires the first and second indication signals to be within a specified parameter of each other.

24. The computer system of claim 15 wherein:

the output includes a plurality of output signal terminals; and the output indication signal includes a plurality of parallel discrete signals, each provided on one of the plurality of output signal terminals.

25. The computer system of claim 15 wherein the comparison circuit further includes:

a programmable array logic device having a plurality of input terminals for receiving the first and second indication signals and at least one output terminal for providing the output indication signal.

26. The computer system of claim 15 wherein the comparison circuit further includes:

a third input for receiving a third indication signal indicating a third desired voltage level of power for a third electronic component.

27. A computer system including a plurality of computer components comprising:

a comparison circuit having a plurality of inputs, each input for receiving an indication signal indicating a desired voltage level of power for a respective computer component, the comparison circuit having an output;

a power supply configured to supply power to the respective computer components; and wherein, the comparison circuit provides an output indication signal indicating an equivalent desired voltage level as a result of a determination by the comparison circuit that the desired voltage levels are equivalent.

28. The computer system of claim 27 wherein a determination that the desired voltage levels are equivalent requires that the indication signals be equal.

29. The computer system of claim 27 wherein a determination that the desired voltage levels are equivalent requires the indication signals to be within a specified parameter of each other.

30. The computer system of claim 27 wherein:

the power supply includes a DC-to-DC converter, the power supply has an input for receiving a reference indication signal dependent upon the output indication signal provided by the comparison circuit, wherein the power supply supplies at its output, power at a regulated DC voltage level that is dependent upon the reference indication signal.

31. The computer system of claim 30 further comprising:

digital to analog converter having an input for receiving the output indication signal and an output for providing the reference indication signal, the reference indication signal having an analog level corresponding to a digital value of the output indication signal.

32. The computer system of claim 27 wherein a first indication signal is provided by a first processor module and a second indication signal is provided by a second processor module.

33. The computer system of claim 32 wherein the first and second processor modules each include an L2 cache configured to receive power from the power supply.

34. The computer system of claim 27 wherein each indication signal provides a digital value indicating a desired voltage level of power for the respective computer component.

35. The computer system of claim 27 wherein as a result of a determination that only one input of the plurality is receiving an indication signal indicating a desired voltage level, the comparison circuit provides an output indication signal indicating the desired voltage level as determined by the indication signal received by the only one input.

36. The computer system of claim 35 wherein the comparison circuit determines that the only one input is receiving an indication signal by the remaining inputs of the plurality being at a particular input state.

37. The computer system of claim 27 wherein as a result of a determination that only a set of at least one of the plurality of inputs are receiving indication signals indicating desired voltage levels and as a result of a determination that the desired voltage levels received via the set are equivalent, the comparison circuit provides an output indication signal indicating an equivalent desired voltage level.

38. The computer system of claim 27 further comprising:

a light electrically coupled to the comparison circuit for providing an indication that the desired voltage levels are not equivalent.

39. The computer system of claim 27 wherein the power supply supplies power to the respective computer components at a voltage level that is dependent upon the output indication signal.

40. The computer system of claim 27 wherein:

each indication signal includes a plurality of parallel discrete signals;

each indication signal provides a digital value indicating a desired voltage level of power for the respective computer component; and each input includes a plurality of input terminals for receiving the parallel discrete signals.

41. The computer system of claim 27 wherein:

the output includes a plurality of output signal terminals; and the output indication signal includes a plurality of parallel discrete signals, each provided on one of the plurality of output signal terminals.

* * * * *